(No Model.)
H. T. CHESWRIGHT.
SECONDARY BATTERY.
No. 445,542. Patented Feb. 3, 1891.
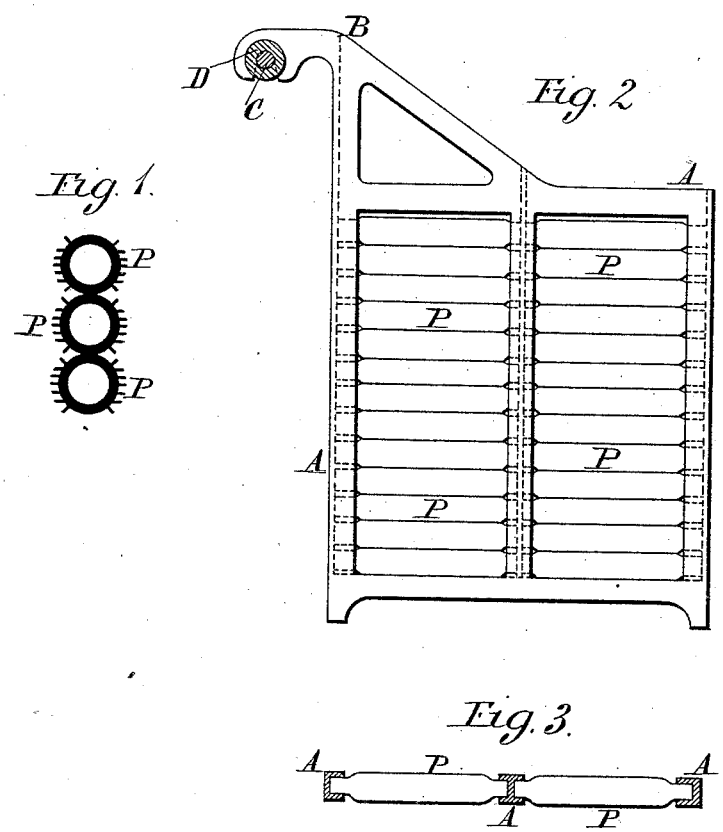
Witnesses:
Thomas King
E. L. Richards
Inventor:
Henry Tyrer Cheswright,
By Richards
Attorneys

UNITED STATES PATENT OFFICE.

HENRY TYRER CHESWRIGHT, OF CARCASSONNE, FRANCE.

SECONDARY BATTERY.

SPECIFICATION forming part of Letters Patent No. 445,542, dated February 3, 1891.

Application filed April 14, 1890. Serial No. 347,793. (No model.)

*To all whom it may concern:*

Be it known that I, HENRY TYRER CHESWRIGHT, a citizen of Great Britain, residing at Carcassonne, Department of Aude, France, have invented new and useful Improvements in Secondary Voltaic Batteries, of which the following is a specification.

My invention relates to the construction and connection of the electrode-plates of secondary voltaic batteries, which I effect as I shall describe, referring to the accompanying drawings. I force lead or alloy through a die, as in the ordinary manufacture of lead pipes; but this die is so formed that the pipe is made with a number of ribs or flanges projecting from its circumference, the spaces between these ribs forming grooves which may be of various shapes and dimensions.

Figure 1 of the accompanying drawings is a transverse section showing three such ribbed pipes P superposed. Fig. 2 is a front view of a frame employed in the carrying out of my invention. Fig. 3 is a plan of the same.

I cut the pipe thus formed into suitable lengths, and I pile these lengths above one another in a frame A, which may be of lead or alloy. The ends of each length of pipe may be flattened, so as to enter grooves in the frame A, or instead of flattening the ends of the pipes they may have inserted in them plugs of lead or alloy projecting into the grooves of the frame. The upper and lower sides of the frame, instead of being cast in the same piece with the vertical sides, may consist each of a length of the ribbed pipe with a bolt of lead or alloy passing through it and securing the vertical sides to it by nuts. I charge the grooves which the pipes present on each side and between each pipe and the next with lead oxide, thus forming an electrode-plate for a secondary battery, a number of which plates I place in a suitable cell. For the purpose of connecting together all the positive plates of the cell and also connecting all the negative plates I make each of the frames A with a bracket B projecting upward and outward from its upper bar. The outer end of this bracket presents a notch or gab like a U inverted, which engages on a longitudinal bolt C, extending the length of the cell. On this bolt C is strung a number of lengths D of lead or alloy pipe, each length serving as a distance-piece between one positive plate and the next, and by screwing the nut on the end or on each end of the bolt C, I tighten up all these distance-pieces against the plates, making good conducting contact. In a similar manner the negative plates of the cell are connected, their brackets extending on the other side of the cell. When it is desired to remove or replace a plate, it is only necessary to partly unscrew the nut or nuts on the bolt, leaving a plate free to be lifted out or allowing a plate to be introduced between two of the distance-pieces.

The pipe P may be round in section, as shown in Fig. 1, or of polygonal or other section, and the ribs on them may be varied in form, so long as they present between them grooves suitable for receiving and holding the lead oxide.

Having thus described the nature of my invention and the best means I know for carrying the same into practical effect, I claim—

1. An electrode-plate for a secondary battery, consisting of a number of lengths of ribbed pipes of lead or alloy held in a suitable frame and having the intervals between their ribs charged with lead oxide, substantially as described.

2. For connecting the electrode-plates of a secondary battery, the combination of gabs in brackets projecting from them with longitudinal bolts on which are strung lengths of pipe as distance-pieces between the plates, substantially as and for the purpose set forth.

In testimony whereof I have signed my name to this specification, in the presence of two subscribing witnesses, this 29th day of March, A. D. 1890.

HENRY TYRER CHESWRIGHT.

Witnesses:
R. J. PRESTON,
CHARLES A. DION.